UNITED STATES PATENT OFFICE.

FRITZ ACH, OF MANNHEIM, GERMANY, ASSIGNOR TO THE FIRM OF C. F. BOEHRINGER & SOEHNE, OF WALDHOF, NEAR MANNHEIM, GERMANY.

ALKOXY-CAFFEIN AND PROCESS OF MAKING SAME.

SPECIFICATION forming part of Letters Patent No. 707,812, dated August 26, 1902.

Application filed April 16, 1898. Serial No. 677,357. (Specimens.)

*To all whom it may concern:*

Be it known that I, FRITZ ACH, a citizen of the German Empire, residing at Mannheim, in the Empire of Germany, have invented certain new and useful Improvements in Alkoxy-Caffeins and the Method of Preparing Them; and I do hereby declare the following to be a full, clear, and exact description of the invention, such as will enable others skilled in the art to which it appertains to make and use the same.

The present invention relates to the art of preparing caffein derivatives and in particular those new derivatives having the group $C_nH_{2n+1}.O.CH_2-$ bound to the N in the position (3) of the caffein or purin molecule, which compounds I designate by the generic term "alkoxy-caffeins."

The invention consists, primarily, in the treatment of $3^1$-8-dichloro-caffein, a compound first discovered and prepared by me and described in my Patent No. 660,744, dated October 30, 1900, with an alcohol and also in the resultant product; and it consists, moreover, in the treatment of the product resulting from such treatment with an alkali-alkylate and also in the treatment of the product of the last-mentioned process with hydrochloric acid.

Finally, my invention consists in such further features, steps, and combinations of steps as will be hereinafter set forth, and pointed out in the claims.

As I have shown in my aforesaid patent, chloro-caffein may be converted into $3^1$-8-dichloro-caffein by acting upon the former with phosphorus-pentachlorid, the $3^1$-8-dichloro-caffein being in turn readily converted into chloro-paraxanthin on heating with water, such conversion taking place over the intermediate product $3^1$-hydroxy-8-chloro-caffein, which is not stable with respect to water, but is decomposed under its influence. Derivatives of this hydroxy or oxy-chloro-caffein may, as I have found, be readily obtained when acting upon $3^1$-8-dichloro-caffein with alcohols—such as methyl-alcohol, ethyl-alcohol, or the like—instead of water. The alkyl-ethers of hydroxy-chloro-caffein so obtained are unaffected by the action of water, and by virtue of their crystallizing readily they are readily isolated and obtained in a pure condition. If, for example, methyl-alcohol is employed in this reaction, $3^1$-methoxy-8-chloro-caffein is obtained, its production proceeding according to the equation:

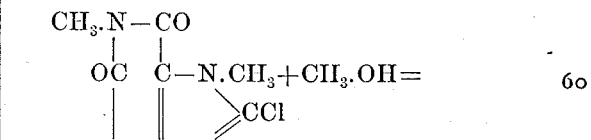

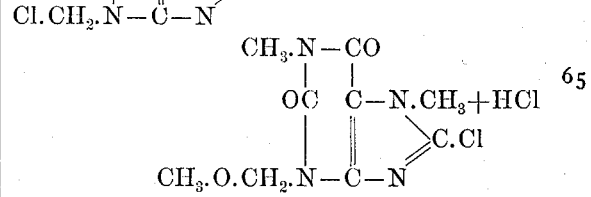

The action of ethyl-alcohol proceeds in an analogous manner. In these chloro-caffein substitutes the chlorin-atom attached to the carbon in the position (8) may in the same manner as for chloro-caffein proper be replaced by hydrogen, methoxyl, ethyl, hydroxyl, or the amido group. We are thus enabled to obtain series of new uric acid and xanthin derivatives. Thus, for example, if we cause an alkali-methylate, such as sodium-methylate, to act upon $3^1$-methoxy-8-chloro-caffein, obtained by the action of methyl-alcohol upon $3^1$-8-dichloro-caffein, the new compound, $3^1$-8-dimethoxy-caffein, is produced according to the equation:

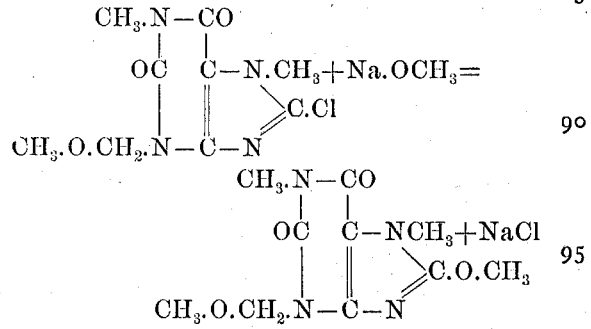

By proceeding indirectly by way of this methoxy compound the chlorin atom (8) is in this case replaced by hydroxyl, just as in the case of chloro-caffein itself. Thus if $3^1$-8-dimethoxy-caffein is cautiously heated with dilute hydrochloric acid the methoxyl group bound to the carbon-atom (8) is split off, as methyl-chlorid, $3^1$-methoxy-hydroxy-caffein being formed according to the equation:

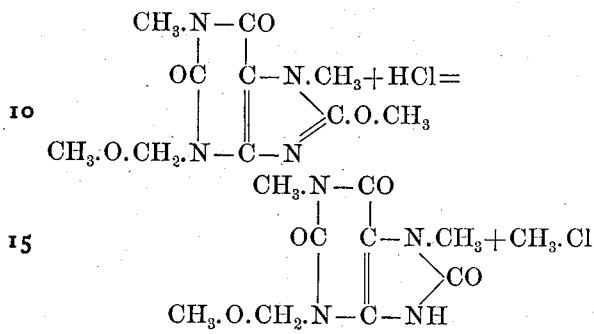

If $3^1$-methoxy-8-chloro-caffein is submitted to the action of reducing agents, the halogen atom is exchanged for hydrogen, $3^1$-methoxy-caffein being obtained, according to the equation:

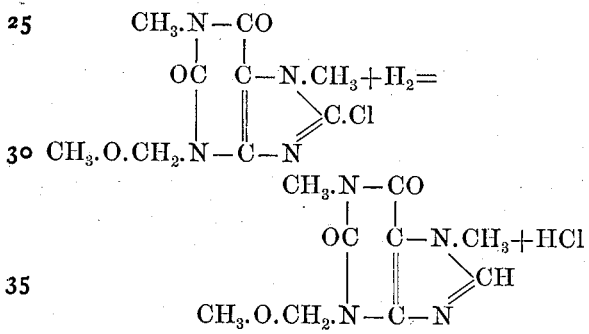

The reduction in the present case is best carried out by reagents which act in alkaline solutions, such as zinc-dust and ammonia, since the action of acids is too apt to lead to the formation of para-xanthin by splitting off the group $CH_2.O.CH_3$ from $3^1$-methoxy-8-chloro-caffein.

I will now illustrate my invention by the following detailed description of processes and the resultant compounds, which constitute what I consider the preferred embodiment of the said invention.

*I. Preparation of $3^1$-methoxy-8-chloro-caffein.*—In preparing $3^1$-methoxy-8-chloro-caffein, as has already been stated, $3^1$-8-dichloro-caffein is taken as the starting material. This starting compound and its method of preparation constitute a part of the subject-matter of my application, Serial No. 677,854, filed concurrently herewith. For the purposes of a full disclosure I will first set forth this method and the characteristic properties of the compound.

*Preparation of $3^1$-8-dichloro-caffein.*—I take twenty-three parts, by weight, of dried chloro-caffein and heat them to from 150° to 155° centigrade in a digester, together with thirty parts, by weight, (corresponding to one and one-half molecules per molecule of chloro-caffein,) of phosphorus-penta-chlorid and one hundred parts, by volume, of phosphorus-oxy-chlorid, maintaining this temperature for from eight to nine hours. The mass is then allowed to cool, when it will be found that no more pressure exists in the vessel and that a reddish-brown solution has been formed containing colorless acicular crystals in suspension. The entire product of the reaction is then well evaporated *in vacuo*, whereby a reddish-brown resinous substance of a tough consistency will be obtained. By dissolving this product in ether and allowing it to stand for some time (about eight to fourteen days) a slightly-colored crystalline mass is obtained, which is then triturated with a little (about one-half part) cold benzene, siphoned off or decanted and then redissolved in and recrystallized from warm ether. The new compound $3^1$-8-dichloro-caffein or 3-chloro-methyl-8-chloro-1-7-dimethyl-xanthin is so obtained in colorless shining well-formed crystals, whose analysis gives figures corresponding to the formula:

$$C_8H_8N_4O_2Cl_2.$$

This new compound melts at 144° to 145.5° centigrade, forming a colorless liquid. With chlorin water it gives the murexid test. It is readily soluble in cold chloroform, aceton, acetic ether, benzene, and in warm ether and alcohol, but soluble with difficulty in cold water. On boiling the same with alcohol or water hydrochloric acid is split off, $3^1$-oxy-8-chloro-caffein or 3-oxymethylene-1-7-dimethyl-8-chloroxanthin or derivatives of the same being formed.

In preparing the $3^1$-methoxy-8-chloro-caffein it is not necessary to start with the $3^1$-8-dichloro-caffein in its pure and crystalline condition; but I may employ directly the syrup or resinous substance which, according to the above, serves for the production of the crystalline product $3^1$-8-dichloro-caffein. Such syrup is boiled, together with about twenty times its weight of absolute methyl-alcohol, for from five to six hours in a reflux cooler and produces a mass containing $3^1$-methoxy-8-chloro-caffein in an impure condition. To purify it, the alcohol is then distilled off completely, and the residue is taken up with ether and washed with water to remove the hydrochloric acid. The ether is evaporated, and a little (about two parts) methyl-alcohol is poured over the residue, which after some time begins to solidify to a crystalline mass. This crystalline mass is then redissolved in methyl-alcohol and recrystallized therefrom, whereby the new body, $3^1$-methoxy-8-chloro-caffein, is obtained in the form of fine shining needles felted together asbestos-like. An analysis of them gives figures corresponding to the formula $$C_9H_{11}N_4O_3Cl,$$

the constitution of the new compound being represented in the structural formula:

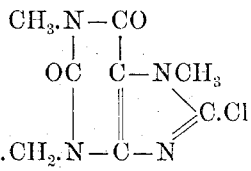

This new compound 3¹-methoxy-8-chloro-caffein melts at 129° to 130° centigrade. With dilute nitric acid or with chlorin water it gives a strong murexid reaction. It is readily soluble in boiling water, hot alcohol, benzene, aceton, acetic ether, or chloroform. It is, moreover, readily soluble in fuming hydrochloric acid. If this solution is heated for some time on the water-bath, however, decomposition takes place, chloro-paraxanthin, which separates in the form of coarse colorless prisms, being formed, attended by a splitting off of formic aldehyde and methylchlorid. In this new compound, 3¹-methoxy-8-chloro-caffein, the chlorin atom attached to the carbon atom in the position (8) may be replaced—for example, by hydrogen, methoxyl, ethyl, hydroxl, or the amido group—just as in the case of chloro-caffein proper. I am thus enabled to obtain a series of new uric acid and xanthin derivatives, several of which, together with their method of preparation, will now be described by way of example.

II. *Preparation of 3¹-8-dimethoxy-caffein.*—For the manufacture of this new body one part, by weight, of 3¹-methoxy-8-chloro-caffein is dissolved in ten parts, by weight, of methyl-alcohol and heated to the boiling-point for about half an hour, together with somewhat more than the necessary quantity, according to computation, of sodium-methylate. The mass is then evaporated to drive off the alcohol and the crystalline residue taken up with water. The resultant product after being recrystallized from dilute alcohol is then obtained in the form of fine needles aggregated concentrically, whose analysis shows them to have the formula $C_{10}H_{14}N_4O_4$. This new compound 3¹-8-dimethoxycaffein has the structural formula:

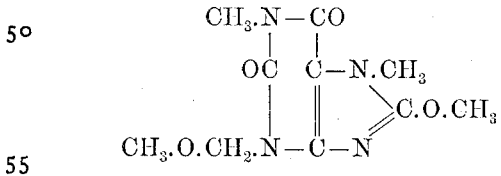

It melts at 153° centigrade and gives a strong murexid reaction with dilute nitric acid or with chlorin water. It is readily soluble in hot water, methyl-alcohol and ethyl-alcohol, and benzene, and in cold acetone, chloroform, and acetic ether. In alkalies it is insoluble, but readily soluble in concentrated hydrochloric acid, by which, however, it is rapidly decomposed.

III. *Preparation of 3¹-methoxy-8-hydroxy-caffein.*—In this process 3¹-8-dimethoxy-caffein just described serves as a starting material, one part of the same, by weight, in a finely-powdered condition being cautiously heated on the water-bath, together with about ten parts of hydrochloric acid of ten per cent. strength, the heating being continued until solution has taken place. During this treatment a copious evolution of methyl chlorid occurs. The solution being completed, the same is cooled with ice-water, whereby fine colorless acicular crystals are thrown out. After standing for several (four to five) hours the liquor is drained from the crystals by filtration, and they are washed with ice-water. The resultant product is recrystallized from methyl-alcohol, whereby coarse colorless needles are obtained, whose formula, according to analysis, is $C_9H_{12}N_4O_4$. This 3¹-methoxy-8-hydroxy-caffein has the structural formula:

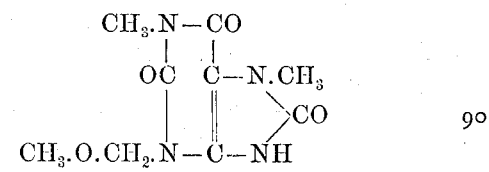

When the same is heated rapidly, it softens at about 220° centigrade, and it melts at from 228° to 229° centigrade. It is readily soluble in water, hot methyl-alcohol, and hot ethyl-alcohol and also very soluble in alkalies, including ammonia. An ammoniacal solution of the same when nitrate of silver is added thereto gives rise to a silver-salt of the same after boiling off the ammonia, said silver-salt crystallizing in the form of fine needles. 3¹-methoxy-hydroxy-caffein gives a strong murexid reaction.

The 3¹-alkoxy-8-chloro-caffein or, specifically, the 3¹-methoxy-8-chloro-caffein described under "I" may be reduced by proper reagents, and thereby we are enabled to obtain 3¹-alkoxy-caffeins or, specifically, 3¹-methoxy-caffein. It may also be treated with proper reagents, such as ammonia, to produce amido compounds having the amido-radical bound to the purin-molecule in the position (8.) Such processes will now be described under head "IV" to still further illustrate the possibilities and reach of the present invention. These latter processes and their resultant products are, however, not claimed herein, since they form the subject-matter of my application filed concurrently herewith, Serial No. 677,858.

IV. *Preparation of 3¹-methoxy-caffein.*—This new compound is obtained by a reduction of the 3¹-methoxy-8-chloro-caffein described under "I." If one part of this methoxy-chloro-caffein is heated to from 105° to 110° centigrade under pressure—i. e., in a closed vessel—together with two parts of zinc-dust, twenty parts of water, and one part, by volume, of concentrated ammonia solution and this temperature is maintained for from four to five hours while agitating the mixture a complete reduction to 3¹-methoxy-caffein is effected. For isolating the new body the liquid while still hot is filtered from the zinc-dust and the filtrate after having been evaporated is repeatedly (two or three times) shaken together with chloroform. The residue after evaporation is redissolved and crystallized from benzene, whereby the $3^1$-methoxy-caffein is obtained in the form of shining colorless prisms or as fine-felted needles. On drying at 105° an analysis of the same shows that the formula $C_9H_{12}N_4O_3$ or, structurally,

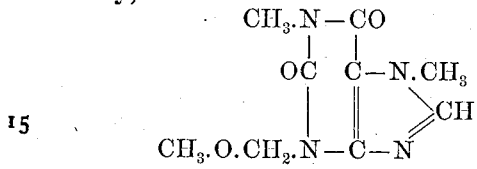

is to be assigned to the new compound. The crystals melt at from 121° to 123° centigrade and sublime when heated to a higher temperature, remaining undecomposed in part. With chlorin-water they give a murexid reaction.

$3^1$-methoxy-caffein is readily soluble in cold water, alcohol, benzene, aceton, or chloroform and is best recrystallized from warm ether or boiling ligroin. From an aqueous solution it is precipitated in the form of fine needles by alkaline lyes. By heating the same with hydrochloric acid $3^1$-methoxy-caffein is converted into paraxanthin.

*V. Preparation of $3^1$-methoxy-8-amido-caffein.*—Here again the $3^1$-methoxy-8-chloro-caffein is taken as the starting material, one part, by weight, of the same being heated under pressure—*e. g.*, in a sealed or closed vessel—to from 130° to 135° centigrade, together with ten times its weight of ammonia saturated at 0° centigrade. This temperature of 130° to 135° centigrade is maintained for eight hours. After cooling the amido compound will be found to have crystallized completely in the form of colorless coarse needles. The liquor is then removed therefrom by siphoning or otherwise, and the crystals are washed with water and recrystallized from alcohol. These crystals melt at from 253° to 255° centigrade, and their analysis gives figures corresponding to the formula $C_9H_{11}N_5O_3$, the molecular structure being represented by the structural formula:

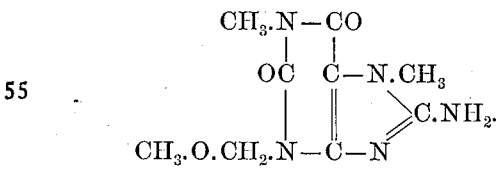

$3^1$-methoxy-8-amido-caffein is dissolved with tolerable ease on boiling with alcohol or water. It is soluble only with considerable difficulty in cold water, cold alcohol, chloroform, and benzene. It is readily soluble in fuming hydrochloric acid; but on account of its slight basic properties it is precipitated from such solutions by water.

The new compounds obtained as above described are to be used as medicines or as starting materials for the manufacture of medicines or drugs.

What I claim, and desire to secure by Letters Patent of the United States, is—

1. In the art of preparing the alkoxy derivatives of chloro-caffein, the process which consists in reacting upon $3^1$-8-dichloro-caffein with an alcohol.

2. In the art of preparing the alkoxy derivatives of chloro-caffein, the process which consists in boiling $3^1$-8-dichloro-caffein with methyl-alcohol.

3. In the art of preparing the alkoxy derivatives of chloro-caffein the process which consists in heating chloro-caffein under pressure, together with phosphorus-penta-chlorid and phosphorus-oxy-chlorid in the proportions and under the conditions substantially as stated, then cooling, and then evaporating the resultant liquor and boiling the residue, together with methyl-alcohol, in a reflux, in the proportions and at the temperature, substantially as stated.

4. As a new series of chemical compounds, alkoxy-chloro-caffeins, that is, alkoxy derivatives of chloro-caffein, said compounds being ethers which may be obtained in the form of crystals and which have the group

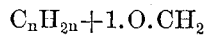

bound to the atom N in the position (3,) said compounds, moreover, all melting above 100° centigrade, and all giving a murexid reaction.

5. As a new chemical compound, $3^1$-methoxy-8-chloro-caffein having the formula above given, and the following properties: it crystallizes in fine shining felted needles, having the melting-point 129° to 130°, centigrade; it is soluble in boiling water, hot alcohol, benzene, aceton, acetic ether and chloroform, and in fuming hydrochloric acid; it gives a strong murexid reaction with dilute nitric acid or chlorin water.

In testimony whereof I affix my signature in presence of two witnesses.

FRITZ ACH.

Witnesses:
  LORENZ ACH,
  GUSTAV HEINRICH.